United States Patent
Maric et al.

(10) Patent No.: US 12,085,734 B1
(45) Date of Patent: Sep. 10, 2024

(54) ELECTRONIC DEVICES WITH LOW-REFLECTANCE COATINGS

(71) Applicant: Apple Inc., Cupertino, CA (US)

(72) Inventors: Ivan S. Maric, San Francisco, CA (US); Alan Kleiman-Shwarsctein, Santa Clara, CA (US); Cole Snider, San Jose, CA (US); James A. Curran, Sunnyvale, CA (US); Jan K. Quijalvo, San Jose, CA (US); Leon J. Garcia, Jr., Mountain View, CA (US); Paisith P. Boonsom, Concord, CA (US); Zechariah D. Feinberg, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 572 days.

(21) Appl. No.: 17/207,453

(22) Filed: Mar. 19, 2021

Related U.S. Application Data

(60) Provisional application No. 63/012,834, filed on Apr. 20, 2020.

(51) Int. Cl.
*G02B 5/00* (2006.01)
*G02B 1/11* (2015.01)
(Continued)

(52) U.S. Cl.
CPC ............... *G02B 5/003* (2013.01); *G02B 1/11* (2013.01); *G02B 7/02* (2013.01); *G02B 25/001* (2013.01);
(Continued)

(58) Field of Classification Search
CPC . G02B 5/003; G02B 1/11; G02B 7/02; G02B 25/001; H04N 23/55; H04N 23/56; H04N 23/57; G06F 1/163
See application file for complete search history.

(56) References Cited

U.S. PATENT DOCUMENTS

| | | | |
|---|---|---|---|
| 4,111,762 A * | 9/1978 | Wade | C25D 11/08 |
| | | | 205/333 |
| 4,589,972 A | 5/1986 | Pompea et al. | |

(Continued)

FOREIGN PATENT DOCUMENTS

WO  WO-2014142474 A1 * 9/2014 ............. B29C 33/38

OTHER PUBLICATIONS

Machine Translation of WO 2014142474 A1 (Year: 2014).*

*Primary Examiner* — Darryl J Collins
*Assistant Examiner* — Matthew Y Lee
(74) *Attorney, Agent, or Firm* — Treyz Law Group, P.C.; G. Victor Treyz; Jinie M. Guihan

(57) ABSTRACT

A head-mounted device may have optical modules that present images to a user's left and right eyes. Each optical module may have a lens barrel with a low-reflectance coating, a display coupled to the lens barrel that generates a visible-light image, a lens mounted to the lens barrel through which the image is viewable from an eye box, an infrared light-emitting diode that emits infrared light that illuminates an eye box at an infrared wavelength through the lens, and an infrared camera that captures an image from the eye box at the infrared wavelength. The low-reflectance coating may be a low-visible-reflectance-and-low-infrared-reflectance coating that exhibits low-reflectance for visible light from the display and for infrared light at the infrared wavelength that is generated by the light-emitting diode.

25 Claims, 8 Drawing Sheets

(51) Int. Cl.
  *G02B 7/02* (2021.01)
  *G02B 25/00* (2006.01)
  *H04N 23/55* (2023.01)
  *H04N 23/56* (2023.01)
  *H04N 23/57* (2023.01)
  *G06F 1/16* (2006.01)

(52) U.S. Cl.
  CPC ............ *H04N 23/55* (2023.01); *H04N 23/56* (2023.01); *H04N 23/57* (2023.01); *G06F 1/163* (2013.01)

(56) References Cited

U.S. PATENT DOCUMENTS

| | | | |
|---|---|---|---|
| 5,066,368 | A | 11/1991 | Pasqualoni et al. |
| 5,326,454 | A * | 7/1994 | Engelhaupt .............. C25D 5/48 205/67 |
| 7,303,644 | B2 | 12/2007 | Kitabayashi et al. |
| 9,467,608 | B2 | 10/2016 | Barros et al. |
| 10,935,830 | B1 * | 3/2021 | Cho .................... G02F 1/13306 |
| 2007/0118939 | A1 * | 5/2007 | Repetto ................. G02B 1/118 438/706 |
| 2018/0059320 | A1 * | 3/2018 | Miller ................. G02B 6/02142 |
| 2020/0159027 | A1 * | 5/2020 | Patel ................. G02B 27/0176 |
| 2020/0241172 | A1 * | 7/2020 | Hayashi ................. G02B 1/116 |
| 2020/0271831 | A1 * | 8/2020 | Ge ......................... G02B 5/005 |
| 2021/0080680 | A1 * | 3/2021 | Maric ................... G02B 7/025 |
| 2021/0176383 | A1 * | 6/2021 | Kim ...................... H04N 23/57 |

* cited by examiner

ELECTRONIC DEVICES WITH LOW-REFLECTANCE COATINGS

This application claims the benefit of provisional patent application No. 63/012,834, filed Apr. 20, 2020, which is hereby incorporated by reference herein in its entirety.

FIELD

This relates generally to electronic devices, and, more particularly, to electronic devices with light-absorbing coatings.

BACKGROUND

Electronic devices such as head-mounted devices may have displays for displaying images. The displays may be housed in optical modules. Lenses may be mounted in the optical modules. In some devices, optical components may emit and detect light.

SUMMARY

A head-mounted device may have optical modules that present images to the user's left and right eyes. Each optical module may have a lens barrel with a low-reflectance coating to suppress stray light, a display coupled to the lens barrel that generates a visible-light image, a lens mounted to the lens barrel through which the image is viewable from an eye box, an infrared light-emitting diode that emits infrared light that illuminates the eye box at an infrared wavelength through the lens, and an infrared camera that captures an image from the eye box at the infrared wavelength.

The low-reflectance coating may be a low-visible-reflectance-and-low-infrared-reflectance coating that exhibits low reflectance for stray visible light from the display and for stray infrared light at the infrared wavelength from the light-emitting diode. The coating may be formed by roughening the surface of the lens barrel using an anodization process that creates pores, filling the pores with light-absorbing material such as tin, and wet etching the surface of the barrel in an etchant such as hot phosphoric acid to create surface roughness with lateral dimensions on the order of 10 nm and an etch depth of about 1 micron.

DETAILED DESCRIPTION

An electronic device such as a head-mounted device may have a front face that faces away from a user's head and may have an opposing rear face that faces the user's head. Optical modules on the rear face may be used to provide images to a user's eyes. Each optical module may have a lens barrel in which a lens is mounted. The lenses may be used to view displays that are mounted to the lens barrels. Components that emit and detect light may be mounted within the lens barrels. To suppress stray light reflections, the lens barrels may have low-reflectance coatings.

Figure 1:
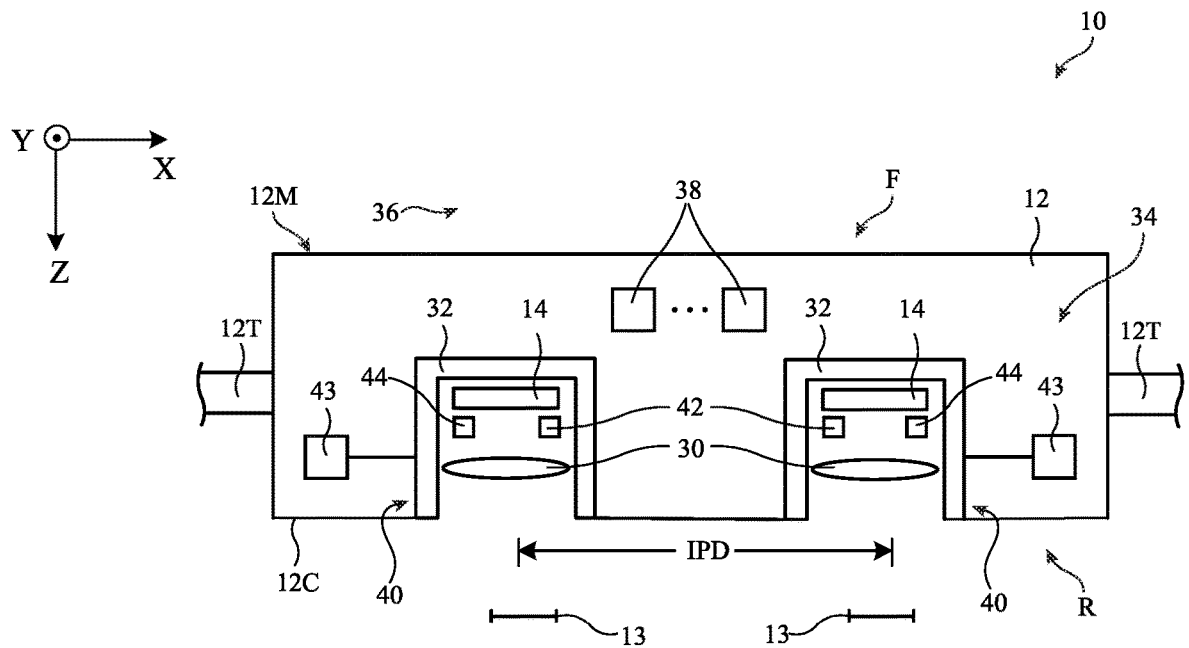
FIG. 1 is a top view of an illustrative head-mounted device in accordance with an embodiment.

A top view of an illustrative head-mounted device is shown in FIG. 1. As shown in FIG. 1, head-mounted devices such as electronic device 10 may have head-mounted support structures such as housing 12. Housing 12 may include portions (e.g., support structures 12T) to allow device 10 to be worn on a user's head. Support structures 12T may be formed from fabric, polymer, metal, and/or other material. Support structures 12T may form a strap or other head-mounted support structures to help support device 10 on a user's head. A main support structure (e.g., main housing portion 12M) of housing 12 may support electronic components such as displays 14. Main housing portion 12M may include housing structures formed from metal, polymer, glass, ceramic, and/or other material. For example, housing portion 12M may have housing walls on front face F and housing walls on adjacent top, bottom, left, and right side faces that are formed from rigid polymer or other rigid support structures and these rigid walls may optionally be covered with electrical components, fabric, leather, or other soft materials, etc. The walls of housing portion 12M may enclose internal components 38 in interior region 34 of device 10 and may separate interior region 34 from the environment surrounding device 10 (exterior region 36). Internal components 38 may include integrated circuits, actuators, batteries, sensors, and/or other circuits and structures for device 10. Housing 12 may be configured to be worn on a head of a user and may form glasses, a hat, a helmet, goggles, and/or other head-mounted device. Configurations in which housing 12 forms goggles may sometimes be described herein as an example.

Front face F of housing 12 may face outwardly away from a user's head and face. Opposing rear face R of housing 12 may face the user. Portions of housing 12 (e.g., portions of main housing 12M) on rear face R may form a cover such as cover 12C (sometimes referred to as a curtain). The presence of cover 12C on rear face R may help hide internal housing structures, internal components 38, and other structures in interior region 34 from view by a user.

Device 10 may have left and right optical modules 40. Optical modules 40 support electrical and optical components such as light-emitting components and lenses and may therefore sometimes be referred to as optical assemblies, optical systems, optical component support structures, lens and display support structures, electrical component support structures, or housing structures. Each optical module may include a respective display 14, lens 30, and support structure 32. Support structures 32, which may sometimes be referred to as lens barrels, lens support structures, optical component support structures, or optical module support structures, may include hollow cylindrical structures with open ends or other supporting structures to house displays 14 and lenses 30. Support structures 32 may, for example, include a left lens barrel that supports a left display 14 and left lens 30 and a right lens barrel that supports a right display 14 and right lens 30.

Displays 14 may include arrays of pixels or other display devices to produce images. Displays 14 may, for example, include organic light-emitting diode pixels formed on substrates with thin-film circuitry and/or formed on semiconductor substrates, pixels formed from crystalline semiconductor dies, liquid crystal display pixels, scanning display devices, and/or other display devices for producing images.

Lenses 30 may include one or more lens elements for providing image light from displays 14 to respective eyes boxes 13. Lenses may be implemented using refractive glass lens elements, using mirror lens structures (catadioptric lenses), using Fresnel lenses, using holographic lenses, and/or other lens systems.

When a user's eyes are located in eye boxes 13, displays (display panels) 14 operate together to form a display for device 10 (e.g., the images provided by respective left and right optical modules 40 may be viewed by the user's eyes in eye boxes 13 so that a stereoscopic image is created for the user). The left image from the left optical module fuses with the right image from a right optical module while the display is viewed by the user.

It may be desirable to monitor the user's eyes while the user's eyes are located in eye boxes 13. For example, it may be desirable to use a camera to capture images of the user's irises (or other portions of the user's eyes) for user authentication. It may also be desirable to monitor the direction of the user's gaze. Gaze tracking information may be used as a form of user input and/or may be used to determine where, within an image, image content resolution should be locally enhanced in a foveated imaging system. To ensure that device 10 can capture satisfactory eye images while a user's eyes are located in eye boxes 13, each optical module 40 may be provided with a camera such as camera 42 and one or more light sources such as light-emitting diodes 44 (e.g., lasers, lamps, etc.). Cameras 42 and light-emitting diodes 44 may operate at any suitable wavelengths (visible, infrared, and/or ultraviolet). With an illustrative configuration, which may sometimes be described herein as an example, diodes 44 emit infrared light that is invisible (or nearly invisible) to the user. This allows eye monitoring operations to be performed continuously without interfering with the user's ability to view images on displays 14.

Not all users have the same interpupillary distance IPD. To provide device 10 with the ability to adjust the interpupillary spacing between modules 40 along lateral dimension X and thereby adjust the spacing IPD between eye boxes 13 to accommodate different user interpupillary distances, device 10 may be provided with actuators 43. Actuators 43 can be manually controlled and/or computer-controlled actuators (e.g., computer-controlled motors) for moving support structures 32 relative to each other. Information on the locations of the user's eyes may be gathered using, for example, cameras 42. The locations of eye boxes 13 can then be adjusted accordingly.

Figure 2:
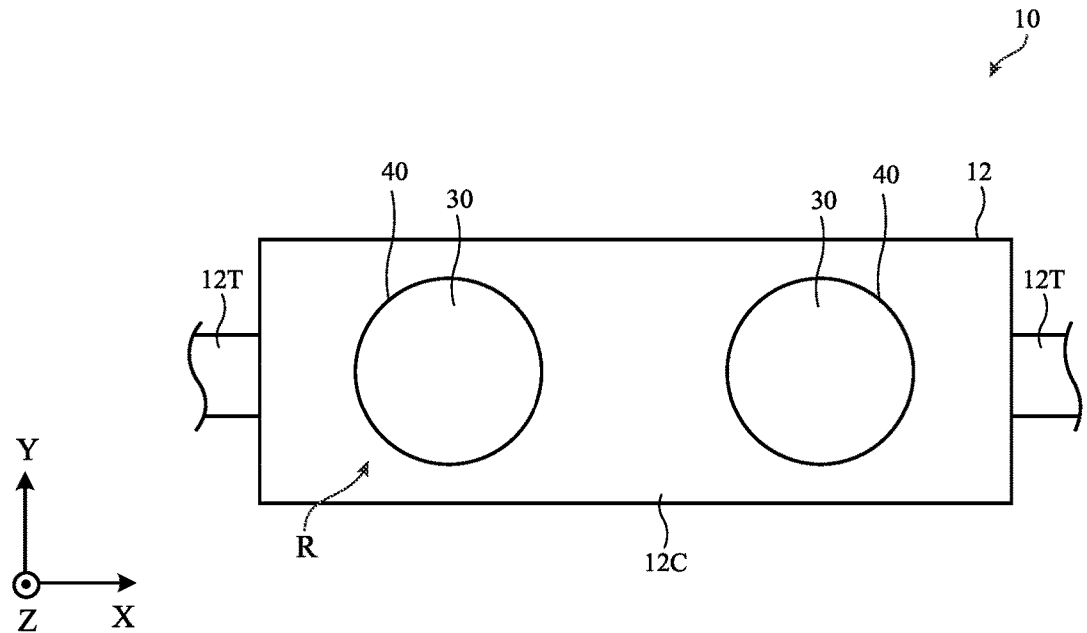
FIG. 2 is a rear view of an illustrative head-mounted device in accordance with an embodiment.

As shown in the rear view of device 10 of FIG. 2, cover 12C may cover rear face R while leaving lenses 30 of optical modules 40 uncovered (e.g., cover 12C may have openings that are aligned with and receive modules 40). As modules 40 are moved relative to each other along dimension X to accommodate different interpupillary distances for different users, modules 40 move relative to fixed housing structures such as the walls of main portion 12M and move relative to each other.

Figure 3:
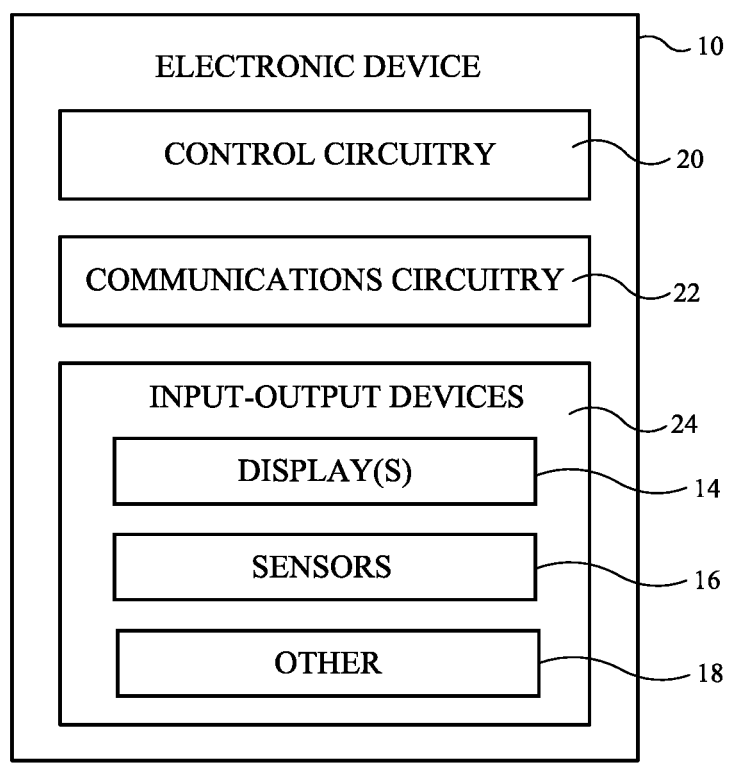
FIG. 3 is a schematic diagram of an illustrative head-mounted device in accordance with an embodiment.

A schematic diagram of an illustrative electronic device such as a head-mounted device or other wearable device is shown in FIG. 3. Device 10 of FIG. 3 may be operated as a stand-alone device and/or the resources of device 10 may be used to communicate with external electronic equipment. As an example, communications circuitry in device 10 may be used to transmit user input information, sensor information, and/or other information to external electronic devices (e.g., wirelessly or via wired connections). Each of these external devices may include components of the type shown by device 10 of FIG. 3.

As shown in FIG. 3, a head-mounted device such as device 10 may include control circuitry 20. Control circuitry 20 may include storage and processing circuitry for supporting the operation of device 10. The storage and processing circuitry may include storage such as nonvolatile memory (e.g., flash memory or other electrically-programmable-read-only memory configured to form a solid state drive), volatile memory (e.g., static or dynamic random-access-memory), etc. Processing circuitry in control circuitry 20 may be used to gather input from sensors and other input devices and may be used to control output devices. The processing circuitry may be based on one or more microprocessors, microcontrollers, digital signal processors, baseband processors and other wireless communications circuits, power management units, audio chips, application specific integrated circuits, etc. During operation, control circuitry 20 may use display(s) 14 and other output devices in providing a user with visual output and other output.

To support communications between device 10 and external equipment, control circuitry 20 may communicate using communications circuitry 22. Circuitry 22 may include antennas, radio-frequency transceiver circuitry, and other wireless communications circuitry and/or wired communications circuitry. Circuitry 22, which may sometimes be referred to as control circuitry and/or control and communications circuitry, may support bidirectional wireless communications between device 10 and external equipment (e.g., a companion device such as a computer, cellular telephone, or other electronic device, an accessory such as a point device, computer stylus, or other input device, speakers or other output devices, etc.) over a wireless link. For example, circuitry 22 may include radio-frequency transceiver circuitry such as wireless local area network transceiver circuitry configured to support communications over a wireless local area network link, near-field communications transceiver circuitry configured to support communications over a near-field communications link, cellular telephone transceiver circuitry configured to support communications over a cellular telephone link, or transceiver circuitry configured to support communications over any other suitable wired or wireless communications link. Wireless communications may, for example, be supported over a Bluetooth® link, a WiFi® link, a wireless link operating at a frequency between 10 GHz and 400 GHz, a 60 GHz link, or other millimeter wave link, a cellular telephone link, or other wireless communications link. Device 10 may, if desired, include power circuits for transmitting and/or receiving wired and/or wireless power and may include batteries or other energy storage devices. For example, device 10 may include a coil and rectifier to receive wireless power that is provided to circuitry in device 10.

Device 10 may include input-output devices such as devices 24. Input-output devices 24 may be used in gathering user input, in gathering information on the environment surrounding the user, and/or in providing a user with output.

Devices 24 may include one or more displays such as display(s) 14. Display(s) 14 may include one or more display devices such as organic light-emitting diode display panels (panels with organic light-emitting diode pixels formed on polymer substrates or silicon substrates that contain pixel control circuitry), liquid crystal display panels, microelectromechanical systems displays (e.g., two-dimensional mirror arrays or scanning mirror display devices), display panels having pixel arrays formed from crystalline semiconductor light-emitting diode dies (sometimes referred to as microLEDs), and/or other display devices.

Sensors 16 in input-output devices 24 may include force sensors (e.g., strain gauges, capacitive force sensors, resistive force sensors, etc.), audio sensors such as microphones, touch and/or proximity sensors such as capacitive sensors such as a touch sensor that forms a button, trackpad, or other input device), and other sensors. If desired, sensors 16 may include optical sensors such as optical sensors that emit and detect light, ultrasonic sensors, optical touch sensors, optical proximity sensors, and/or other touch sensors and/or proximity sensors, monochromatic and color ambient light sensors, image sensors, fingerprint sensors, iris scanning sensors, retinal scanning sensors, and other biometric sensors, temperature sensors, sensors for measuring three-dimensional non-contact gestures ("air gestures"), pressure sensors, sensors for detecting position, orientation, and/or motion (e.g., accelerometers, magnetic sensors such as compass sensors, gyroscopes, and/or inertial measurement units that contain some or all of these sensors), health sensors such as blood oxygen sensors, heart rate sensors, blood flow sensors, and/or other health sensors, radio-frequency sensors, depth sensors (e.g., structured light sensors and/or depth sensors based on stereo imaging devices that capture three-dimensional images), optical sensors such as self-mixing sensors and light detection and ranging (lidar) sensors that gather time-of-flight measurements, humidity sensors, moisture sensors, gaze tracking sensors, electromyography sensors to sense muscle activation, facial sensors, and/or other sensors. In some arrangements, device 10 may use sensors 16 and/or other input-output devices to gather user input. For example, buttons may be used to gather button press input, touch sensors overlapping displays can be used for gathering user touch screen input, touch pads may be used in gathering touch input, microphones may be used for gathering audio input (e.g., voice commands), accelerometers may be used in monitoring when a finger contacts an input surface and may therefore be used to gather finger press input, etc.

If desired, electronic device 10 may include additional components (see, e.g., other devices 18 in input-output devices 24). The additional components may include haptic output devices, actuators for moving movable housing structures, audio output devices such as speakers, light-emitting diodes for status indicators, light sources such as light-emitting diodes that illuminate portions of a housing and/or display structure, other optical output devices, and/or other circuitry for gathering input and/or providing output. Device 10 may also include a battery or other energy storage device, connector ports for supporting wired communication with ancillary equipment and for receiving wired power, and other circuitry.

Figure 4:
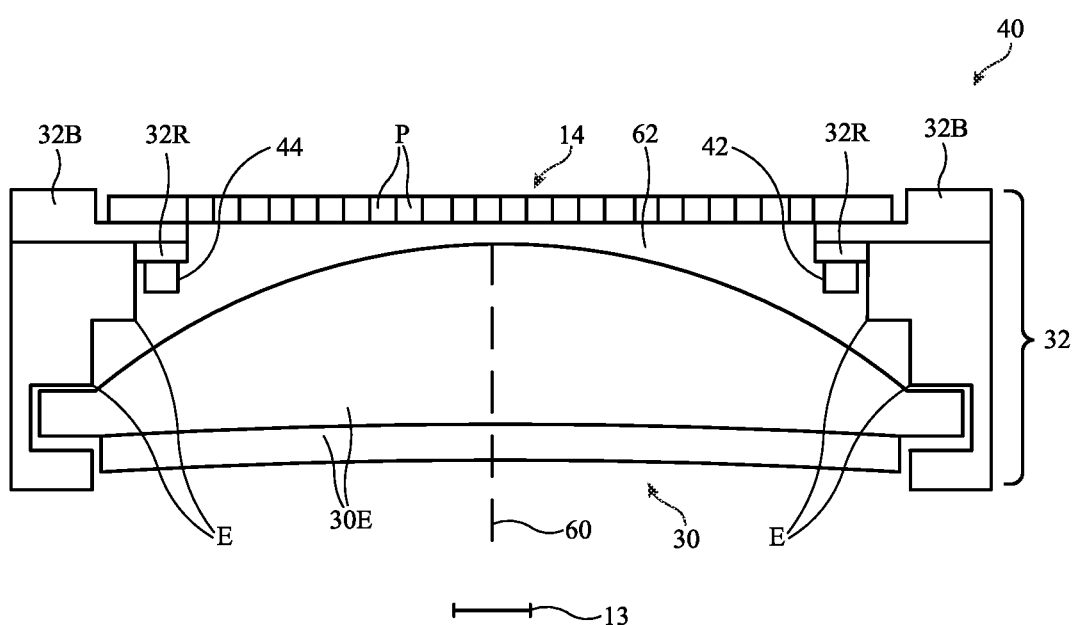
FIG. 4 is a cross-sectional side view of an illustrative head-mounted device optical module in accordance with an embodiment.

A cross-sectional side view of an illustrative optical module for device 10 is shown in FIG. 4. As shown in FIG. 4, optical module 40 may have support structures for display 14 and lens 30 such as lens barrel 32. During operation, lens 30 may be used to provide an image from pixels P of display 14 to eye box 13 along optical axis 60. When a user's eye is located in eye box 13, the user may view the image from display 14.

Lens 30 may be formed from one or more lens elements. In an illustrative configuration, which is sometimes described herein as an example, lens 30 is a catadioptric lens having front and rear lens elements 30E. Optical films 50 (e.g., linear polarizers, reflective polarizers, wave plates, partially reflective mirrors, antireflection coatings, and/or other optical layers) may be formed on one or more of the surfaces of the lens elements in lens 30. For example, one or more optical films and/or one or more adhesive layers for joining the lens elements and optical films together may be interposed between lens elements 30F and 30R. One or more optical films may also be formed on one or both of the exposed surfaces of lens 30. As an example, the surface of lens 30 that faces display 14 may be covered with a partially reflective mirror. The mating surfaces of lens elements 30E may have cylindrical curvature or may have other surface shapes (e.g., other curved shapes). The exterior surfaces of lens elements 30E may be spherical and/or aspherical. Lens elements 30E may be formed from glass, clear crystalline material such as sapphire, clear ceramic, and/or other transparent materials such as polymer. Transparent polymer may be shaped using molding techniques and/or machining techniques (e.g., using drills, milling machines, saws, polishing tools, laser-processing tools, grinding tools, and/or other tools for shaping and polishing lens 30).

During the operation of device 10, it may be desirable to gather information on the eyes of a user located in eye boxes 13. One or more cameras such as camera 42 of FIG. 4 and one or more light sources such as light-emitting diodes 44 may be located in interior region 60 of optical module 40 between lens 30 and display 14. Light-emitting diodes 44 may extend in a partial or full ring around the perimeter of display 14 (e.g., light-emitting diodes 44 may be mounted on a ring-shaped flexible circuit that extends in a rectangular ring shape, oval ring shape, and/or other ring shape surrounding optical axis 60). There may be one, at least two, at least four, at least six, fewer than 20, fewer than 10 or other suitable number of light-emitting diodes 44 (and/or other light sources such as lasers).

Light from light-emitting diodes 44 may illuminate the user's eyes in eye boxes such as eye box 13 of FIG. 4. The light provided by light-emitting diodes 44 may include visible light and/or infrared light. Camera 42 may be sensitive at corresponding wavelengths of light. In an illustrative configuration, one or more of light-emitting diodes 44 may emit light at a first wavelength (e.g., 850 nm, at least 740 nm, at least 830 nm, less than 900 nm, less than 1050 nm, and/or other suitable infrared wavelength) and one or more of light-emitting diodes 44 may emit light at a second wavelength that is longer than the first wavelength (e.g., 940 nm, at least 830 nm, at least 850 nm, at least 900 nm, less than 1000 nm, less than 1050 nm, at least 740 nm, and/or other suitable infrared wavelength). The light at the second wavelength may serve as gaze tracking illumination. The light at the first wavelength may illuminate the user's eyes during iris scanning operations (e.g., on start-up of device 10). Other types of infrared and/or visible light illumination may be provided by light-emitting diodes 44, if desired. The use of illumination at first and second wavelengths is illustrative.

The use of infrared light at the first wavelength in illuminating eye box 13 during iris scanning may help ensure that the eyes of the user are illuminated sufficiently to capture a clear iris image (eye image) during image capture operations with camera 42 (which is sensitive to light at the first wavelength). In an illustrative configuration, iris scan illumination is provided during initial start-up operations of device 10 (e.g., so that camera 42 can capture an eye image such as an iris scan or other biometric identification information). This allows device 10 to authenticate a user before the user is permitted to use device 10 and/or access information associated with the user's account. To ensure satisfactory contrast when capturing iris scans, the light at the first wavelength may be relatively close to the edge of the visible spectrum at 740 nm (e.g., 850 nm).

Some users may be able to faintly observe light at the first wavelength. Light at the second wavelength may be completely invisible to all users, allowing light at the second wavelength to be used continuously or nearly continuously for gaze tracking operations (e.g., after start-up operations). During gaze tracking operations, light-emitting diodes 44 may be used to provide gaze tracking illumination to eye boxes 13 while camera 42 captures eye images such as pupil images and/or eye images containing direct reflections of light-emitting diodes from the user's eyes (sometimes referred to as glints).

The support structures for optical module 40 may be formed from one or more supporting members. For example, one or more ring-shaped members may form the sides of lens barrel 32 surrounding lens 30. The support structures of module 40 (e.g., lens barrel 32) may, if desired, have a ring-shaped member that helps support display 14 (see, e.g., ring-shaped display bezel 32B, which may be attached to other portions of lens barrel 32 using adhesive, fasteners such as screws, welds, etc.). Electrical components such as camera(s) 42 and light-emitting diode(s) 44 may be supported using a ring-shaped cover. For example, cover ring 32R may have openings that receive respective electrical components. Light-emitting diodes 44 may, as an example, be mounted on a printed circuit substrate. Cover ring 32R may have through-hole openings arranged around some or all of the periphery of cover ring 32R. Each through-hole opening may receive a respective optical component (e.g., a respective light-emitting diode 44) and these optical components may be coupled to the cover ring using adhesive (e.g., adhesive with low-visible-light reflectance and sufficient infrared transmittance to allow emitted light from each light-emitting diode 44 to pass).

During operation of device 10, display 14 may emit stray visible light and/or stray visible light from display 14 may reflect from lens 30 (e.g., a partial mirror on the innermost surface of lens 30) onto the interior surfaces of lens barrel 32. Illumination from light-emitting diodes 44 may also potentially strike lens barrel 32 directly or after reflecting from lens 30. Stray visible light from display 14 can interfere with the user's ability to view images from display 14 satisfactorily. Stray eye illumination (e.g., stray infrared illumination from light-emitting diodes 44 at the first and/or second wavelengths) can interfere with the ability of camera 42 to capture satisfactory eye images (e.g., for biometric authentication and/or gaze tracking).

To suppress undesired visible and infrared stray light in interior 62, the surfaces of lens barrel 32 in interior 62 may be provided with a low-reflectance coating (e.g., a coating with a reflectance of less than 1% or less than 2% from 380 nm to 1000 nm (as an example). The coating may be formed by anodizing lens barrel 32, electrodepositing light-absorbing material into anodization pores on lens barrel 32, and etching lens barrel 32 to create surface roughness on the pores and/or by otherwise treating the surface of lens barrel 32 to form a coating that exhibits low visible light reflection and low infrared light reflection. Any or all of the support structures in optical module 40 that are potentially exposed to stray visible and/or infrared light may be provided with the low-reflectance coating (e.g., display bezel 32R, light-emitting diode cover ring 32R, and/or other portions of lens barrel 32 may be provided with the low-reflectance coating). This may be accomplished by forming bezel 32R, ring 32R, and/or other portions of lens barrel 32 from aluminum members or other structures that may be provided with a low-visible-reflectance-and-low-infrared-reflectance coating (e.g., a low-reflectance anodized coating).

Figure 5:
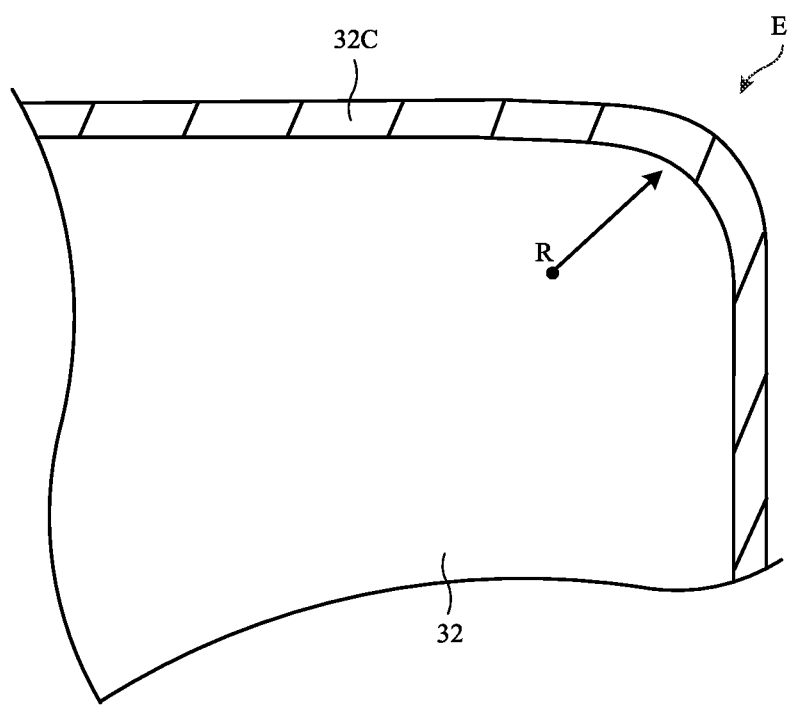
FIG. 5 is a cross-sectional side view of a step portion of an illustrative lens barrel in a head-mounted device optical module in accordance with an embodiment.

In the illustrative configuration of FIG. 4, lens barrel 32 has a cylindrical shape characterized by a longitudinal axis that is aligned with and/or parallel to optical axis 60. The walls of lens barrel 32 extend in a ring around axis 60 and may have one or more steps (sometimes referred to as shelf structures) characterized by step edges (shelf edges) E. Step edges E may be formed where the inner surfaces of lens barrel 32 that extend horizontally in FIG. 4 (with surface normals perpendicular to optical axis 60) meet with the inner surfaces of lens barrel 32 that extend vertically in FIG. 4 (with surface normals parallel to optical axis 60). Anodization operations tend to produce surface pores that extend parallel to the surface normal of the surface being anodized. There is therefore a risk that edges E will not be well covered by an anodized coating layer if edges E are sharp. As shown in FIG. 5, edges E may be provided with rounded (curved) cross-sectional profiles. As an example, each shelf edge E may be provided with a curved (rounded) cross-sectional shape of radius R, where the value of R is 0.5 mm, 0.3 to 2 mm, at least 0.1 mm, at least 0.25 mm, less than 3 mm, less than 1.5 mm, less than 0.8 mm, or other suitable value. The use of rounded edges E helps ensure that low-reflectance coating 32C will extend uniformly across edges E and thereby helps ensure that edges E will exhibit low reflectance.

The thickness of coating 32C may be 50 microns, at least 1 micron, at least 10 microns, at least 20 microns, at least 40 microns, at least 200 microns, less than 1000 microns, less than 300 microns, less than 120 microns, less than 75 microns, or less than 40 microns (as examples). Coating 32C may include black paint or ink (e.g., polymer containing black colorant such as pigment and/or dye), may include a black anodized layer, may include electroplated material, may include roughened surfaces formed by sand blasting, walnut blasting, chemical etching, machining (e.g., grinding, sanding, etc.), laser exposure, and/or other suitable surface roughening techniques. Low-reflectance material (e.g., chemically deposited layers, polymer layers including black colorant, etc.) may be deposited as part of an anodization process and/or may be applied separately. Multiple reflectivity reducing treatments may be applied to lens barrel 32, if desired.

Figure 6:
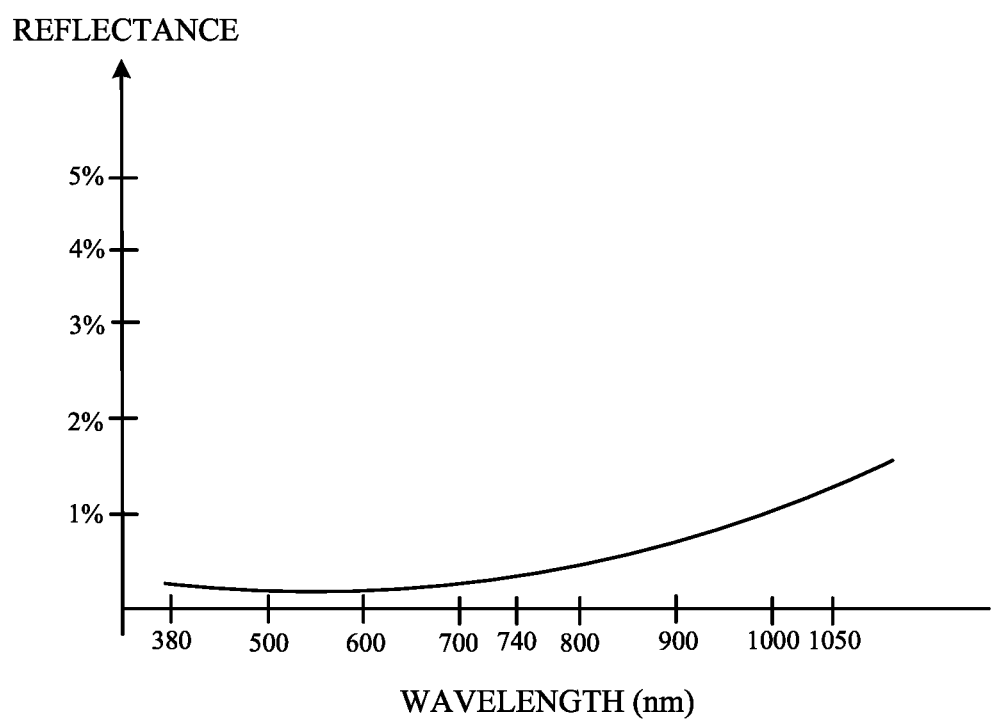
FIG. 6 is a graph in which light reflectance has been plotted as a function of wavelength for an illustrative low-reflectance coating in accordance with an embodiment.

FIG. 6 is a graph in which the reflectance of an illustrative low-reflectance coating. The low-reflectance coating may be a coating such as coating 32C on lens barrel 32 or may be a low-reflectance coating formed on a surface of any other suitable electronic device support structure (e.g., an optical component support structure). FIG. 6 covers wavelengths such as visible light wavelengths and infrared light wavelengths. The visible light spectrum extends from 380 nm to 740 nm and includes representative visible light wavelengths such as 400 nm, 500 nm, and 600 nm. The near infrared spectrum lies just beyond the 740 nm edge of the visible light spectrum and includes representative infrared wavelengths such as 850 nm, and 940 nm).

In the example of FIG. 6, coating 32C exhibits a low visible light reflectance (e.g., the reflectance of coating 32C across visible light wavelengths between 380 nm and 740 nm has a value R that is less than 3.5%, less than 3%, less than 2%, less than 1%, less than 0.5%, or less than 0.3% (as examples). Coating 32C of FIG. 6 also exhibits a low infrared light reflectance (e.g., the reflectance of coating 32C is less than 4%, less than 3%, less than 2.5%, less than 2%, less than 1.5%, or less than 1% at wavelengths of at least 740 nm, at least 800 nm, 740-1000 nm, 850 nm, 900-950 nm, 940 nm, less than 1000 nm, etc.). Because coatings for lens barrel 32 such as coating 32C of FIG. 6 exhibit low reflectance for both visible and infrared wavelengths, these coatings may sometimes be referred to as low-visible-reflectance-and-low-infrared-reflectance coatings.

Coating 32C may be formed by roughening the surface of a lens barrel or other structure in device 10 for which low reflectance is desired. In general, lens barrel 32 may be formed from any suitable unreflective structures (e.g., polymer or metal with black paint or other low-reflectance black polymer material such as polymer containing black pigment and/or black dye). If desired, barrel 32 or other coated structures may be formed from magnesium plated with aluminum, aluminum magnesium, aluminum zirconium, etc. Barrels that are plated in this way may be anodized and/or etched to create surface pores and/or may otherwise be provided with surface roughness (e.g., with wet etching following pore formation). Illustrative configurations in which lens barrel 32 is formed from a metal (e.g., aluminum) that is anodized and wet etched may sometimes be described herein as an example.

Figure 7:
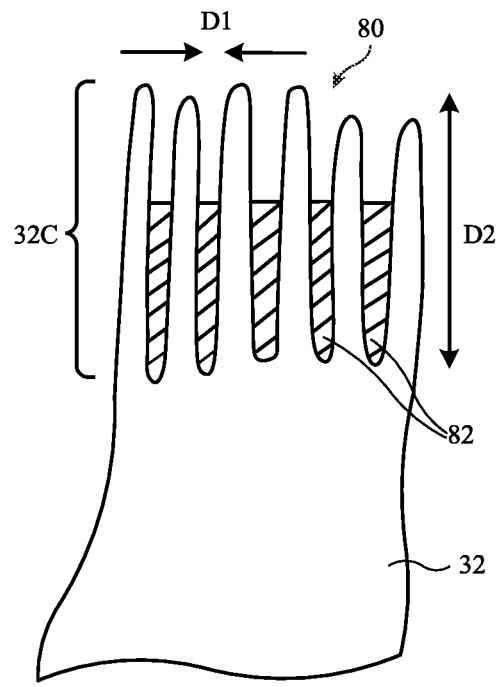
FIGS. 7, 8, and 9 are cross-sectional side views of illustrative treated surfaces in accordance with embodiments.

Anodization is an electrolytic process whereby lens barrel 32 is coated with an oxide layer by supplying current to lens barrel 32 through an electrolytic solution. During anodization, the metal of lens barrel 32 serves as an anode. The anodization of lens barrel 32 creates elongated features such as pores and creates associated surface roughness, as illustrated by illustrative coating 32C on lens barrel 32 of FIG. 7. As shown in FIG. 7, the anodization process forms pores 80. Pores 80 may be characterized by lateral dimensions (diameters) D1 and longitudinal dimensions (depths) D2. The value of D1 may be, for example, at least 10 nm, at least 25 nm, at least 30 nm, 50 nm, less than 75 nm, less than 500 nm, 20-80 nm, or other suitable value. The value of D2 may be, for example, at least 3 microns, at least 5 microns, at least 10 microns, 15 microns, less than 20 microns, less than 30 microns, less than 45 microns, 2-50 microns, 4-45 microns, or other suitable pore depth.

The rough surface formed by the array of pores 80 on the surface of lens barrel 32 may exhibit reduced reflectance compared to a bare metal surface. Further reductions in reflectance may be achieved by filling pores 80 with a light-absorbing material or light-scattering material and/or etching the surface with a wet etchant (e.g., an acid). As shown in FIG. 7, for example, pores 80 may be filled partly or completely with a material that is light-absorbing and/or light-scattering (material 82). In an illustrative configuration, material 82 may be electrodeposited tin. If desired, material 82 may be formed from one or more other materials such as nickel and other electrodepositable transition metal (e.g., Au, Cu, Co, Cr, etc.) or mixtures thereof, an oxide (e.g., a metal oxide), or a sulfide (e.g., cobalt sulfide). Light-absorbing material may also be formed from a visible-light-absorbing-and-infrared-light-absorbing dye(s).

The tin or other material 82 in pores 80 may absorb and/or scatter visible and infrared light and may therefore have a black appearance. Pores 80 may be 10-90% filled with electrodeposited tin or other material 82 or may be at least 20% filled, may be at least 30%, may be filled 50%, may be less than 65% filled, may be less than 70% filled, may be less than 85% filled, may be 25-75% filled, may be 100% filled, or may be filled by another amount.

Figure 8:
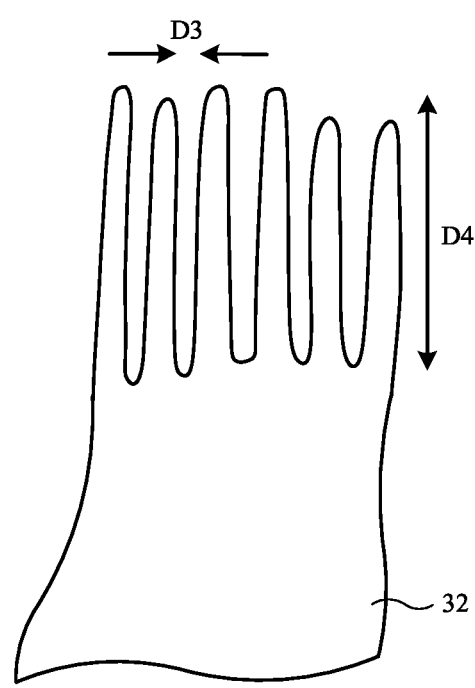
Figure 9:
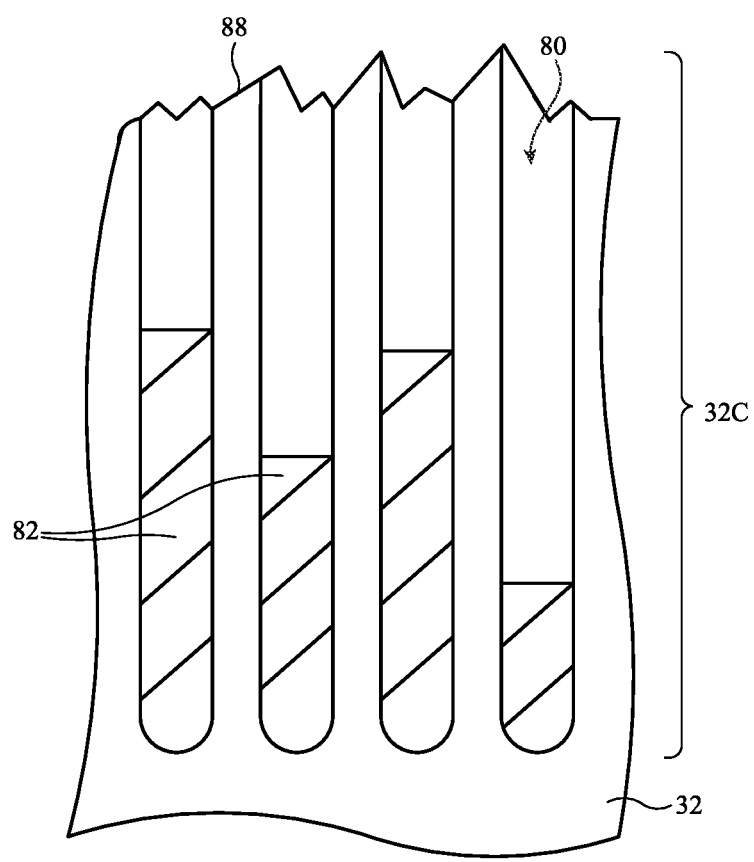

To further reduce the reflectance of coating 32, lens barrel 32 may be treated with a wet etchant following deposition of material 82 in pores 80. Wet etching in the etchant may produce enhanced surface roughness (e.g., the wet-etched surface of barrel 32 may provide the exposed surfaces of pores 80 with surface roughness). As shown by the surface of barrel 32 in FIG. 8, for example, the treated surface of barrel 32 (e.g., the surface of coating 32C such as the exposed surfaces of ports 80) may be characterized by surface roughness features having post-etching lateral dimensions D3 and an etch depth of D4. The value of D3 may be, for example, 5-50 nm, 10 nm, at least 5 nm, at least 6 nm, less than 100 nm, less than 50 nm, less than 500 nm, and/or other suitable value. The value of etch depth D4 may be at least 0.1 microns, at least 0.2 microns, 0.1-3 microns, 1 micron, at least 3 microns, at least 0.7 microns, less than 2 microns, less than 2.5 microns, less than 1.5 microns, 0.4-1.6 microns, or other suitable value. Hot concentrated phosphoric acid or other wet etchant may be used in wet etching the pores and other surface structures of coating 32C to help reduce the visible light and infrared reflectance of coating 32C. FIG. 9 is a cross-sectional side view of a portion of barrel 32 following treatment to produce coating 32C (e.g., after forming pores 80 filled with material 82 and following wet etching to create rough wet-etched surface 88).

Figure 10:
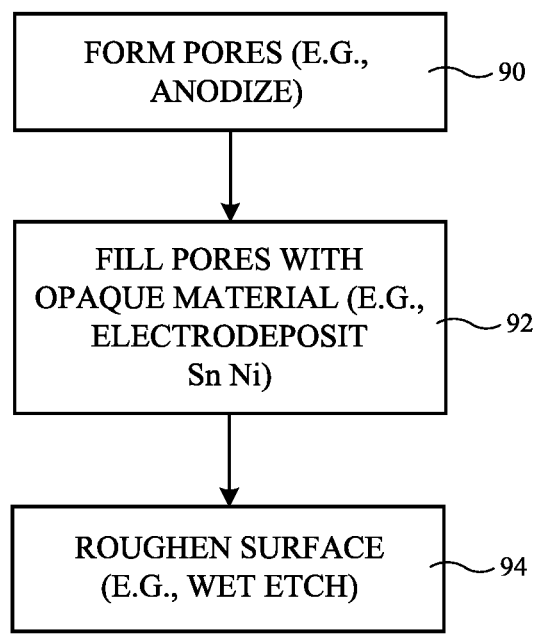
FIG. 10 is a flow chart of illustrative operations involved in forming low-reflectance coatings in accordance with an embodiment.

A flow chart of illustrative operations involved in forming a structure in device 10 that exhibits reduced visible light and infrared light reflections is shown in FIG. 10. These operations may be used to provide any suitable electronic device support structure (or a metal structure or other structure in any item) with a low-reflectance surface (e.g., a low-visible-reflectance-and-low-infrared-reflectance surface). The support structure may be a housing structure, an optical component support structure such as a lens barrel for supporting a display, lens, camera, and light-emitting diodes, an optical component support structure that supports other optical components (e.g., optical sensors, etc.), and/or other structures in device 10 for which low-reflectance is desired. A support structure that is provided with this type of low-reflectance surface may include polymer, metal, ceramic, glass, carbon-fiber composite and/or other composite material, other materials, and/or combinations of these materials. In an illustrative configuration, device 10 has one or more support structures such as lens barrel 32 (e.g., a lens barrel that is formed completely from metal or a lens barrel that is formed at least partly from metal such as a polymer lens barrel coated in metal) and each support structure (e.g. each lens barrel 32) has a coating that exhibits low visible and infrared reflectance such as low-visible-reflectance-and-low-infrared-reflectance coating 32C.

During the operation of block 90, the surface of lens barrel 32 may be roughened to form a surface characterized by pores 80 of FIG. 7 or other roughened surface features. Examples of techniques that may be used for roughening the surface of lens barrel 32 include walnut blasting, sand blasting, polishing, machining, laser exposure, wet and/or dry etching, etc. With an illustrative configuration, lens barrel 32 is placed in an electrolytic bath and current is applied to anodize the surface of lens barrel 32. Anodization may, if desired, produce surface features of the type shown in FIG. 7 in which pores of diameter D1 extend a depth D2 into the surface of lens barrel 32. Step edges with rounded surface profiles on barrel 32 will have pores 80 the extend perpendicular to the curved surfaces of the step edges.

During the operations of block 92, pores 80 may be filled with light-absorbing and/or light-scattering material. This pore-filling material may be, for example, a black dye (e.g., a dye that absorbs visible light and that may absorb some infrared light). In an illustrative configuration, pores 80 are filled with electrodeposited tin (see, e.g., material 82 of FIG. 9). The presence of electrodeposited tin in pores 80 helps enhance absorption of both visible and infrared light (e.g., tin helps create a visible-light-absorbing-and-infrared-light-absorbing surface for barrel 32), so incorporation of material 82 into the coating on lens barrel 32 helps lower infrared and visible light reflectance. Tin and/or other electrodeposited light-absorbing material may, if desired, be deposited before, during, and/or after depositing other light-absorbing materials such as black dye or pigment.

During the operations of block 94, the surface of barrel 32 may be further roughened (e.g., by dry and/or wet etching). In an illustrative configuration, a wet etchant such as hot concentrated phosphoric acid may be used to etch the surface of barrel 32 to produce wet-etched rough surface 88 of FIG. 9. The phosphoric acid etch (or other etch) may create surface roughness with lateral features on the order of 10 nm and a wet etch depth of about 1 micron (see, e.g., FIG. 8) on the anodized (and filled) pores. This wet etch process therefore further reduces the visible light and infrared reflectance of coating 32C (e.g., so that coating 32C exhibits a reflectance spectrum such as the reflectance spectrum of FIG. 6 or otherwise exhibits suitably low visible and infrared reflectance values).

As described above, one aspect of the present technology is the gathering and use of information such as information from input-output devices. The present disclosure contemplates that in some instances, data may be gathered that includes personal information data that uniquely identifies or can be used to contact or locate a specific person. Such personal information data can include demographic data, location-based data, telephone numbers, email addresses, twitter ID's, home addresses, data or records relating to a user's health or level of fitness (e.g., vital signs measurements, medication information, exercise information), date of birth, username, password, biometric information, or any other identifying or personal information.

The present disclosure recognizes that the use of such personal information, in the present technology, can be used to the benefit of users. For example, the personal information data can be used to deliver targeted content that is of greater interest to the user. Accordingly, use of such personal information data enables users to calculated control of the delivered content. Further, other uses for personal information data that benefit the user are also contemplated by the present disclosure. For instance, health and fitness data may be used to provide insights into a user's general wellness, or may be used as positive feedback to individuals using technology to pursue wellness goals.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the United States, collection of or access to certain health data may be governed by federal and/or state laws, such as the Health Insurance Portability and Accountability Act (HIPAA), whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology can be configured to allow users to select to "opt in" or "opt out" of participation in the collection of personal information data during registration for services or anytime thereafter. In another example, users can select not to provide certain types of user data. In yet another example, users can select to limit the length of time user-specific data is maintained. In addition to providing "opt in" and "opt out" options, the present disclosure contemplates providing notifications relating to the access or use of personal information. For instance, a user may be notified upon downloading an application ("app") that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data at a city level rather than at an address level), controlling how data is stored (e.g., aggregating data across users), and/or other methods.

Therefore, although the present disclosure broadly covers use of information that may include personal information data to implement one or more various disclosed embodiments, the present disclosure also contemplates that the various embodiments can also be implemented without the need for accessing personal information data. That is, the various embodiments of the present technology are not rendered inoperable due to the lack of all or a portion of such personal information data.

Physical environment: A physical environment refers to a physical world that people can sense and/or interact with without aid of electronic systems. Physical environments, such as a physical park, include physical articles, such as physical trees, physical buildings, and physical people. People can directly sense and/or interact with the physical environment, such as through sight, touch, hearing, taste, and smell.

Computer-generated reality: in contrast, a computer-generated reality (CGR) environment refers to a wholly or partially simulated environment that people sense and/or interact with via an electronic system. In CGR, a subset of a person's physical motions, or representations thereof, are tracked, and, in response, one or more characteristics of one or more virtual objects simulated in the CGR environment are adjusted in a manner that comports with at least one law of physics. For example, a CGR system may detect a person's head turning and, in response, adjust graphical content and an acoustic field presented to the person in a manner similar to how such views and sounds would change in a physical environment. In some situations (e.g., for accessibility reasons), adjustments to characteristic(s) of virtual object(s) in a CGR environment may be made in response to representations of physical motions (e.g., vocal commands). A person may sense and/or interact with a CGR object using any one of their senses, including sight, sound, touch, taste, and smell. For example, a person may sense and/or interact with audio objects that create 3D or spatial audio environment that provides the perception of point audio sources in 3D space. In another example, audio objects may enable audio transparency, which selectively incorporates ambient sounds from the physical environment with or without computer-generated audio. In some CGR environments, a person may sense and/or interact only with audio objects. Examples of CGR include virtual reality and mixed reality.

Virtual reality: A virtual reality (VR) environment refers to a simulated environment that is designed to be based entirely on computer-generated sensory inputs for one or more senses. A VR environment comprises a plurality of virtual objects with which a person may sense and/or interact. For example, computer-generated imagery of trees, buildings, and avatars representing people are examples of virtual objects. A person may sense and/or interact with virtual objects in the VR environment through a simulation of the person's presence within the computer-generated environment, and/or through a simulation of a subset of the person's physical movements within the computer-generated environment.

Mixed reality: In contrast to a VR environment, which is designed to be based entirely on computer-generated sensory inputs, a mixed reality (MR) environment refers to a simulated environment that is designed to incorporate sensory inputs from the physical environment, or a representation thereof, in addition to including computer-generated sensory inputs (e.g., virtual objects). On a virtuality continuum, a mixed reality environment is anywhere between, but not including, a wholly physical environment at one end and virtual reality environment at the other end. In some MR environments, computer-generated sensory inputs may respond to changes in sensory inputs from the physical environment. Also, some electronic systems for presenting an MR environment may track location and/or orientation with respect to the physical environment to enable virtual objects to interact with real objects (that is, physical articles from the physical environment or representations thereof). For example, a system may account for movements so that a virtual tree appears stationery with respect to the physical ground. Examples of mixed realities include augmented reality and augmented virtuality. Augmented reality: an augmented reality (AR) environment refers to a simulated environment in which one or more virtual objects are superimposed over a physical environment, or a representation thereof. For example, an electronic system for presenting an AR environment may have a transparent or translucent display through which a person may directly view the physical environment. The system may be configured to present virtual objects on the transparent or translucent display, so that a person, using the system, perceives the virtual objects superimposed over the physical environment. Alternatively, a system may have an opaque display and one or more imaging sensors that capture images or video of the physical environment, which are representations of the physical environment. The system composites the images or video with virtual objects, and presents the composition on the opaque display. A person, using the system, indirectly views the physical environment by way of the images or video of the physical environment, and perceives the virtual objects superimposed over the physical environment. As used herein, a video of the physical environment shown on an opaque display is called "pass-through video," meaning a system uses one or more image sensor(s) to capture images of the physical environment, and uses those images in presenting the AR environment on the opaque display. Further alternatively, a system may have a projection system that projects virtual objects into the physical environment, for example, as a hologram or on a physical surface, so that a person, using the system, perceives the virtual objects superimposed over the physical environment. An augmented reality environment also refers to a simulated environment in which a representation of a physical environment is transformed by computer-generated sensory information. For example, in providing pass-through video, a system may transform one or more sensor images to impose a select perspective (e.g., viewpoint) different than the perspective captured by the imaging sensors. As another example, a representation of a physical environment may be transformed by graphically modifying (e.g., enlarging) portions thereof, such that the modified portion may be representative but not photorealistic versions of the originally captured images. As a further example, a representation of a physical environment may be transformed by graphically eliminating or obfuscating portions thereof. Augmented virtuality: an augmented virtuality (AV) environment refers to a simulated environment in which a virtual or computer generated environment incorporates one or more sensory inputs from the physical environment. The sensory inputs may be representations of one or more characteristics of the physical environment. For example, an AV park may have virtual trees and virtual buildings, but people with faces photorealistically reproduced from images taken of physical people. As another example, a virtual object may adopt a shape or color of a physical article imaged by one or more imaging sensors. As a further example, a virtual object may adopt shadows consistent with the position of the sun in the physical environment.

Hardware: there are many different types of electronic systems that enable a person to sense and/or interact with various CGR environments. Examples include head mounted systems, projection-based systems, heads-up displays (HUDs), vehicle windshields having integrated display capability, windows having integrated display capability, displays formed as lenses designed to be placed on a person's eyes (e.g., similar to contact lenses), headphones/ earphones, speaker arrays, input systems (e.g., wearable or handheld controllers with or without haptic feedback), smartphones, tablets, and desktop/laptop computers. A head mounted system may have one or more speaker(s) and an integrated opaque display. Alternatively, a head mounted system may be configured to accept an external opaque display (e.g., a smartphone). The head mounted system may incorporate one or more imaging sensors to capture images or video of the physical environment, and/or one or more microphones to capture audio of the physical environment. Rather than an opaque display, a head mounted system may have a transparent or translucent display. The transparent or translucent display may have a medium through which light representative of images is directed to a person's eyes. The display may utilize digital light projection, OLEDs, LEDs, µLEDs, liquid crystal on silicon, laser scanning light sources, or any combination of these technologies. The medium may be an optical waveguide, a hologram medium, an optical combiner, an optical reflector, or any combination thereof. In one embodiment, the transparent or translucent display may be configured to become opaque selectively. Projection-based systems may employ retinal projection technology that projects graphical images onto a person's retina. Projection systems also may be configured to project virtual objects into the physical environment, for example, as a hologram or on a physical surface.

The foregoing is merely illustrative and various modifications can be made to the described embodiments. The foregoing embodiments may be implemented individually or in any combination.

What is claimed is:

1. A head-mounted device optical module, comprising:
a support structure;
electrical components coupled to the support structure including a first component that emits visible light and a second component that emits infrared light; and
a lens located within the support structure and configured to provide image light to an eye box, wherein the support structure has a coating that helps suppress reflections of the emitted visible light and the infrared light.

2. The head-mounted device optical module defined in claim 1 wherein the support structure comprises a lens barrel, wherein the first component comprises a display coupled to the lens barrel, wherein the second component comprises an infrared-light-emitting diode, wherein the visible light has a visible light wavelength, wherein the infrared light has an infrared light wavelength, and wherein the coating has a reflectance of less than 1% at the visible light wavelength and has a reflectance of less than 3% at the infrared light wavelength.

3. The head-mounted device optical module defined in claim 2 wherein an interior region is formed between the lens, the display, and the lens barrel, the head-mounted device optical module further comprising:
an infrared camera in the interior that is configured to capture an image from an eye box through the lens.

4. The head-mounted device optical module defined in claim 3 wherein the infrared light wavelength comprises a wavelength of at least 830 nm and less than 1050 nm.

5. The head-mounted device optical module defined in claim 1 wherein the support structure comprises metal.

6. The head-mounted device optical module defined in claim 5 wherein the coating comprises an anodized surface of the metal having pores that contain light-absorbing material.

7. The head-mounted device optical module defined in claim 6 further comprising a wet-etched rough surface on the anodized surface of the metal.

8. The head-mounted device optical module defined in claim 7 wherein the pores have diameters of 25-100 nm.

9. The head-mounted device optical module defined in claim 7 wherein the lens barrel comprises aluminum and wherein the light-absorbing material comprises a light-absorbing material selected from the group consisting of: tin, nickel, cobalt, a transition metal, an oxide, and a sulfide.

10. The head-mounted device optical module device in claim 7 wherein the light-absorbing material comprises a visible-light-absorbing-and-infrared-light-absorbing dye.

11. The head-mounted device optical module defined in claim 7 wherein the light-absorbing material fills at least 20% and less than 70% of the pores.

12. The head-mounted device optical module defined in claim 7 wherein the pores have depths of at least 5 microns and less than 45 microns.

13. The head-mounted device optical module defined in claim 7 wherein the wet-etched rough surface has an etch depth of at least 0.2 microns and less than 2 microns and is characterized by roughness features with lateral dimensions of less than 500 nm.

14. The head-mounted device optical module defined in claim 1 wherein the support structure comprises a ring-shaped display bezel, wherein the first component comprises a display coupled to the ring-shaped display bezel, and wherein the coating is formed at least partly on the ring-shaped display bezel.

15. The head-mounted device optical module defined in claim 1 wherein the second component comprises an infrared-light-emitting diode, wherein the support structure comprises a light-emitting diode cover ring to which the infrared-light-emitting diode is coupled, and wherein the coating is formed at least partly on the cover ring.

16. An optical assembly, comprising:
a display configured to display an image;
a lens through which the image is viewable from an eye box; and
a support structure in which the lens is mounted, wherein the support structure comprises a wet-etched anodized coating configured to exhibit a reflectance of less than 0.5% at a visible light wavelength and a reflectance of less than 1.5% at an infrared light wavelength.

17. The optical assembly defined in claim 16 wherein the visible light wavelength is 500 nm.

18. The optical assembly defined in claim 16 wherein the infrared light wavelength is 940 nm.

19. The optical assembly defined in claim 16 further comprising:
an infrared light-emitting diode configured to emit infrared light at the infrared light wavelength.

20. The optical assembly defined in claim 19 further comprising an infrared camera configured to capture an additional image from an eye box through the lens.

21. The optical assembly defined in claim 16 further comprising a display coupled to the support structure.

22. A head-mounted device, comprising:
a head-mounted support structure; and
optical modules coupled to the head-mounted support structure, wherein each optical module has a lens barrel, a display that is coupled to the lens barrel and that is configured to emit visible light at a visible light wavelength, a lens coupled to the lens barrel and configured to provide image light from the display to an eye box, an infrared camera coupled to the lens barrel that is configured to capture an image from the eye box through the lens at an infrared light wavelength, and an infrared light source that is configured to emit infrared light at the infrared light wavelength to illuminate the eye box, wherein the lens barrel has a light-absorbing coating having a wet-etched surface.

23. The head-mounted device defined in claim 22 wherein the wet-etched surface has wet-etched features with a lateral feature size of 2 nm to 15 nm and an etch depth of at least 0.5 microns and less than 2 microns.

24. The head-mounted device defined in claim 23 wherein the lens barrel comprises anodized aluminum and wherein the light-absorbing coating has pores that contain electrodeposited light-absorbing material.

25. The head-mounted device defined in claim 22 wherein the light-absorbing coating has a reflectance of less than 2% from 380 nm to 1000 nm.

\* \* \* \* \*